UNITED STATES PATENT OFFICE.

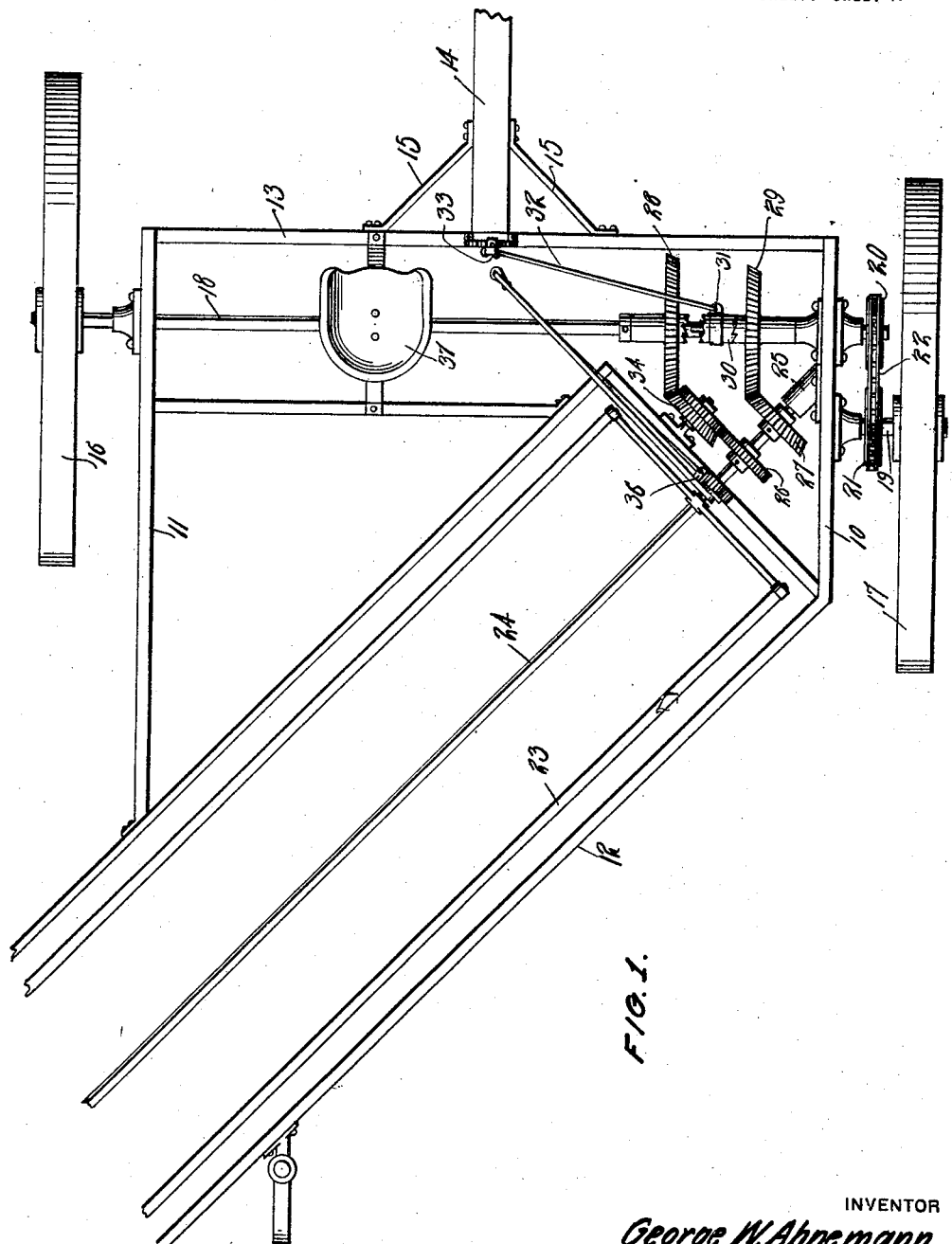

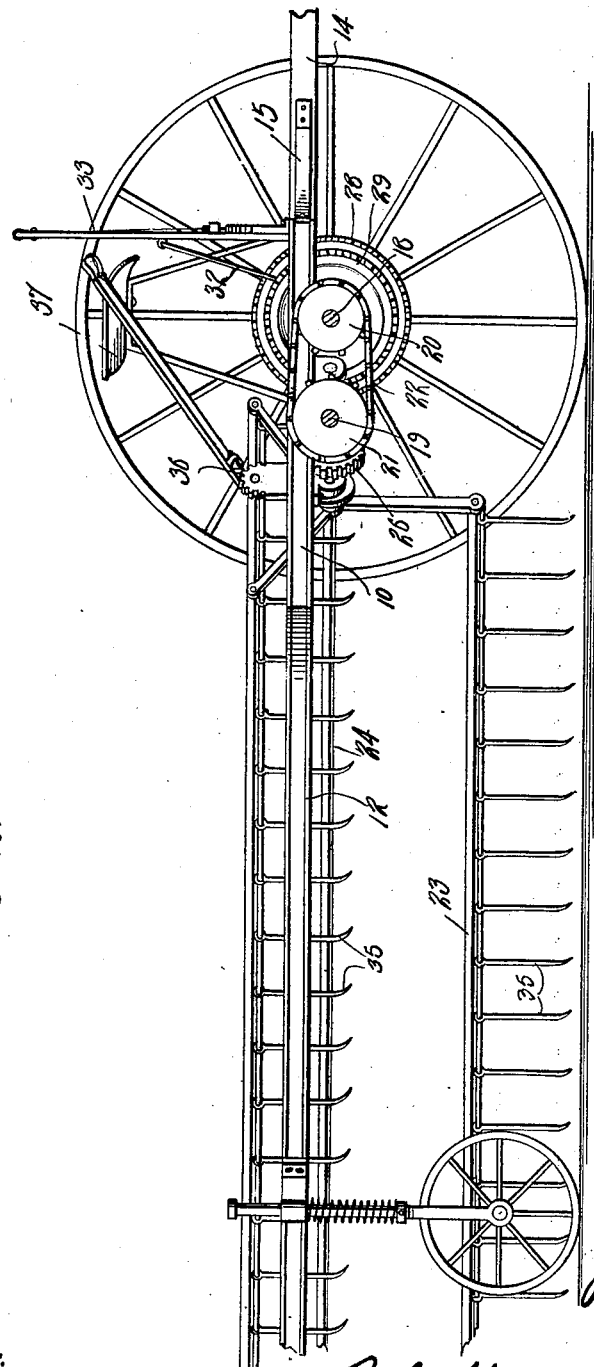

GEORGE W. AHNEMANN, OF WELLS, MINNESOTA.

GEARING.

1,319,033.   Specification of Letters Patent.   Patented Oct. 21, 1919.

Application filed November 19, 1917. Serial No. 202,835.

*To all whom it may concern:*

Be it known that I, GEORGE W. AHNE-MANN, a citizen of the United States, residing at Wells, in the county of Faribault and State of Minnesota, have invented certain new and useful Improvements in Gearing, of which the following is a specification.

This invention is an improved gearing for a rake and tedder and the principal object of the invention is to provide an agricultural machine of the character described so constructed that it may be used either as a side delivery rake or a tedder, the change being effected through shifting of a clutch in the driving mechanism so that the main shaft of the two carrying drums may be rotated either forwardly or rearwardly.

Another object of the invention is to so construct this improved machine that the driving mechanism or transmission structure will not be materially added to over that of rotary rakes now in use thus making it unnecessary to enlarge the frame structure.

Another object of the invention is to provide a machine of the character described in which the driving mechanism will be simple in construction and comprise a comparatively few number of parts.

This invention is illustrated in the accompanying drawings, wherein:—

Figure 1 is a top plan view of the improved rake and tedder, and

Fig. 2 is a side elevation of the improved machine with one of the supporting wheels broken away.

This machine is provided with a frame having side bars 10 and 11 leading from the drum casing indicated in general by the numeral 12 to the forward bar 13 of the frame from which bar extends the draft tongue 14 braced by the side braces 15. The supporting wheels 16 and 17 are mounted upon the axle or main shaft 18 and stub axle 19 respectively, the shaft 18 and stub axle 19 carrying sprocket wheels 20 and 21 about which passes the sprocket chain 22 to operatively connect the stub axle 19 with the main shaft 18 and permit rotary movement to be transmitted from this stub axle to the main shaft. The tooth carrying drum 23 is positioned within the drum frame 12 and is mounted on a shaft 24 oblique to the main shaft and having its inner end journaled in a bearing 25 of the side bar 10. This shaft carries driven gears 26 and 27 which are geared to clutch gears 28 and 29 loosely mounted upon the main shaft 18 upon opposite sides of a clutch element 30 slidably mounted upon the shaft 18 and held against rotation upon the shaft by any conventional means. A collar 31 is positioned about this clutch element 30 and is engaged by a rod 32 leading from the latch lever 33 so that when desired, this clutch element may be moved longitudinally upon the shaft and brought into engagement with either the clutch gear 28 or the clutch gear 29. A double faced idler gear 34 is rotatably mounted between the clutch gear 28 and the gear 26 of the shaft 24 and it will thus be seen that when the clutch element 30 is in engagement with the clutch gear 28, the shaft 24 and drum 23 will be rotated in an opposite direction from that in which they will be rotated when the clutch 30 is in engagement with the clutch gear 29.

When in use, this machine will be drawn across the field and if the machine is to be used as a tedder the clutch 30 will be moved to engage the clutch gear 28. The drum 23 will then be rotated rearwardly and the cut grass will be taken up and thrown to the rear of the machine thus scattering the grass and permitting it to dry thoroughly. If it is desired to use this machine as a rake, the clutch will be moved into engagement with the clutch gear 29 and the rake will then be rotated forwardly thus throwing the grass in front of the machine and delivering the grass at the side of the machine. In order to place the teeth 35 of the drum at the proper angle, there is provided a conventional form of shifting mechanism including an eccentric and an actuating lever 36 extending adjacent the driver's seat 37 where it may be easily reached. This shifting mechanism is of the same type as shown in Patent #946,883. It will thus be seen that there has been provided an agricultural machine of a comparatively simple construction which may be used as a tedder or as a side delivering rake. It will be further seen that there has been provided improved means for transmitting rotary movement to the rake including a clutch element permitting the direction of rotation to be controlled and further permitting the machine to be moved without the drum rotating by simply moving the clutch into position between the clutch gears.

What is claimed is:—

In a device of the character described, the combination of a drive shaft, a second shaft extending at an acute angle to said drive shaft, said drive shaft having a pair of beveled gears carried thereon in spaced relation and of substantially the same size, a sliding clutch splined on said drive shaft between said gears, means for sliding the clutch to engage with each of said gears for rotating the same in the direction of movement of said drive shaft, a beveled gear keyed upon said second shaft and meshing with one of said first mentioned beveled gears, a plain gear having peripheral teeth also fixed upon said second shaft and being of substantially the same size as the beveled gear of said second shaft, a double faced gear member including a beveled gear surface and a plain gear surface contiguous to each other, the beveled gear surface engaging the remaining beveled gear of said drive shaft and the plain gear surface engaging the plain gear of the second shaft, whereby said clutch may be moved to drive either of said beveled gears of the drive shaft to cause rotary motion to be imparted to either the beveled gear of the second shaft or the double face gear and the plain gear of the second shaft causing said first shaft to rotate said second shaft in either of two directions and in either condition at the same rate of speed, as and for the purposes set forth.

In testimony whereof I affix my signature in presence of two witnesses.

GEORGE W. AHNEMANN.

Witnesses:
L. MEDE,
MAMIE AHNEMANN.

Copies of this patent may be obtained for five cents each, by addressing the "Commissioner of Patents, Washington, D. C."